March 17, 1964   PAULETTE GOUIN, NEE GOUIN   3,125,352
COLLAPSIBLE STRUT
Filed Feb. 12, 1962
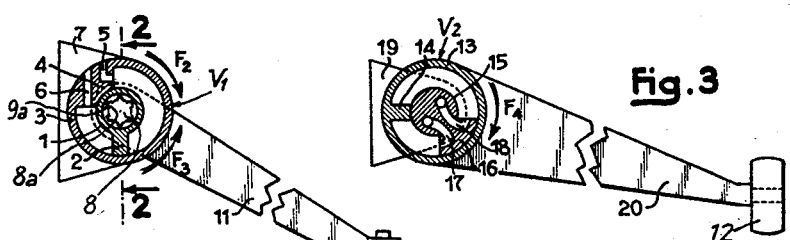
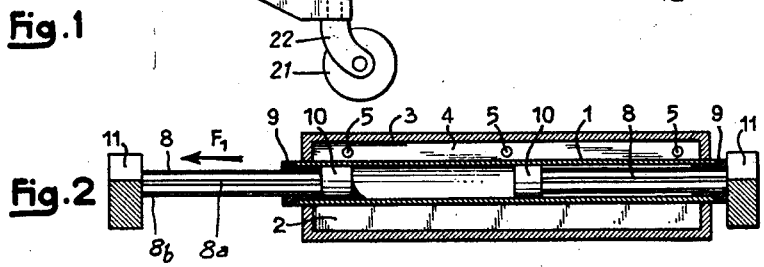
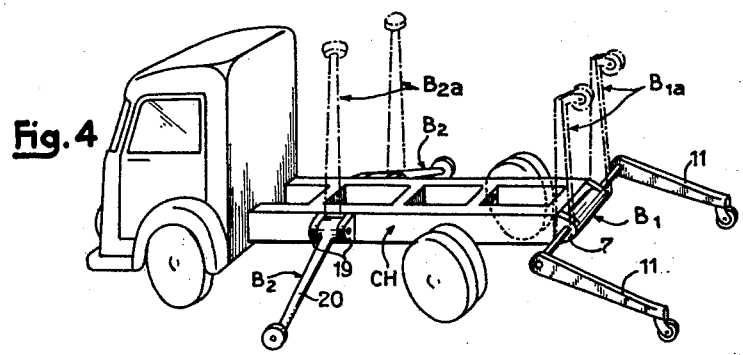
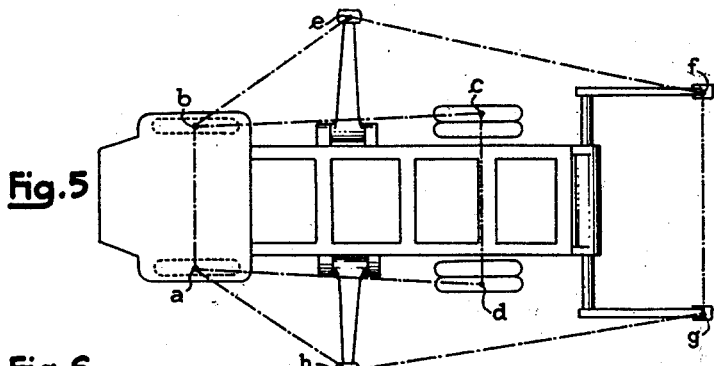
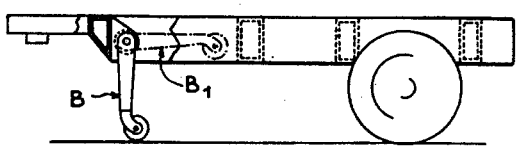
INVENTOR
PAULETTE GOUIN
By Irwin S. Thompson
ATTY.

United States Patent Office 3,125,352
Patented Mar. 17, 1964

3,125,352
COLLAPSIBLE STRUT
Paulette Gouin, née Gouin, 7 Square de la Dordogne,
Paris, France
Filed Feb. 12, 1962, Ser. No. 172,559
Claims priority, application France Feb. 15, 1961
3 Claims. (Cl. 280—150.5)

The lack of stability of certain vehicles is well-known, which are provided with a handling gear, the center of gravity of which is comparatively high above the basis of support. This is the case, in particular, of lorries and semi-trailers when detached from their tractors, when such vehicles are provided e.g. with means for handling a number of cases or with cranes, large firemen's ladders and the like; during operation, the center of gravity of such gears is shifted, sometimes to a considerable extent and it may occur that the projection on the ground of the center of gravity is dangerously near the outline of the basis of support of the vehicle.

My invention has for its object improvements in vehicles such as semi-trailers or lorries, carrying a gear, the center of gravity of which lies at a very high level and which gear is adapted to be shifted over its support during operation to a considerable extent, said vehicles being provided with at least one strut which, according to the invention, is pivotally secured round a horizontal axis carried by the vehicle and controlled by a jack of a type well-known per se, adapted to bring the strut either into engagement with the ground outside the base of support or else raised into engagement with the vehicle body.

My invention has also for its object the control of such struts by jacks operated through liquid pressure and including, on the one hand, a cylinder provided with at least one radial partition at least one of the surfaces of which is provided with the openings of the pipes feeding liquid under pressure into and out of the cylinder and connected with compressing means through the agency of control valves while, on the other hand, a shaft adapted to revolve coaxially with the cylinder, passes fluidtightly through the covers of the cylinder, in fluidtight contacting relationship with the inner edge of the radal partition inside the cylinder, said shaft being rigid with at least one radial blade fluidtightly engaging the inner wall and the covers of the cylinder.

A movement generator of this type, which I may term a rotary jack may serve either with the cylinder held fast to allow movement of the shaft, or else, in a reverse manner, by movement of the body of the actual cylinder, the shaft being held fast.

I will now disclose a few embodiments of my invention, reference being made to the acompanying drawings, wherein:

FIG. 1 is a cross-section passing across the axis of the rotary jack controlling a strut rigid with a rod slidingly fitted in the jack shaft, FIG. 2 is a longitudinal cross-section through line 2—2 of FIG. 1, FIG. 3 is a cross-section passing across the axis of a rotary jack controlling a strut rigid with the jack cylinder, FIG. 4 is a perspective view of a vehicle provided with such struts, FIG. 5 is a corresponding plan view showing the improvement of the basis of support when the struts engage ground, FIG. 6 is a diagrammatic side elevational view of a semi-trailer provided at the front with collapsible bearing struts.

According to the embodiment illustrated in FIGS. 1, 2 and 4, the strut includes a movable U-shaped arrangement including a tubular shaft 1 rigid with a radial blade 2 and revolvably carried inside the cylinder 3 of the rotary jack $V_1$. Said cylinder is inwardly provided with a radial partition 4 into either side of which open ports 5 and 6 inserted in the circuit of a compressed fluid, which circuit is not illustrated. This cylinder 3 carries furthermore at each end, fittings 7 through which it is rigidly secured to the vehicle chassis. Inside the opposite sections of the shaft 1 are slidingly fitted two rods 8 (FIG. 2) provided with corrugations $8a$ and each rod is adapted to engage and slide longitudinally inside the cooperating corrugations $9a$ of a corresponding sleeve 9 rigid with the shaft 1. Each of said rods 8 carries at its end housed inside the hollow shaft 1, a terminal head 10 of a larger diameter, while the other, outer end of each spindle carries a strut 11 to the outer end of which is pivotally fitted a bearing roller or caster 21 through the agency of an angularly shiftable strap 22.

The system thus designed operates as follows: The rods 8 are drawn out by hand in the direction of the arrow $F_1$ (FIG. 2) until the inner head 10 abuts against the cooperating sleeve 9, after which the distributor of fluid is actuated so as to send liquid under presure into the cylinder 3 through the port 5. The liquid pushing the blade 2 of the shaft 1, drives the latter into rotation in the direction of the arrow $F_2$ and the struts 11 angularly rigid with the shaft through the agency of the rods 8 and of the corrugated sockets 9 turn with the shaft. The liquid entering the cylinder 3, is urged against the other surface of the blade 2 and is exhausted through the port 6. The closing of the pipe feeding the port 5, ensures the maintenance of the struts in engagement with the ground, whereas, if the flow of liquid is reversed through actuation of the distrbutor, the liquid is fed into the cylinder through the port 6 and urges the blade 2 rigid with the shaft 1 in the direction of the arrow $F_3$, so as to urge the struts back into their inoperative positions, the liquid urged through the cylinder 3 being then exhausted through the port 5.

The strut illustrated in FIG. 3 is controlled by the movable cylinder 13 of a rotary jack $V_2$, carrying an inner partition 14 revolvably engaging a stationary shaft 15 provided with a blade 16 to either side of which are provided ports 17 and 18 connected with the fluid circuit. The shaft 15 is rigid at its ends with stay-plates 19 (FIG. 4) through which it is rigidly secured to the vehicle chassis. The cylinder 13 carries one or more struts 20 each carrying at its outer free end a roller or caster 12, for engagement with the ground.

When the fluid distributor is actuated so as to feed liquid under pressure through the port 17 in the fin or blade 16, the cylinder 13 starts rotating in the direction of the arrow $F_4$, since it is urged into movement by the liquid acting on the partition 14, which leads to a lowering of the strap 20 into engagement with the ground. The stopping and rising of the struts are executed in a manner similar to that described hereinabove through operation of the fluid distributor.

FIGS. 4 and 5 illustrate an example of application of such struts fitted on a vehicle adapted to carry a crane or the like apparatus, such apparatus not being illustrated for sake of clarity.

The vehicle carries a strut-controlling arrangement $B_1$ including telescopic struts identical with that described with reference to FIGS. 1 and 2 and extending transversely across the rear section of the chassis CH, through the agency of its fittings 7.

I have illustrated in solid lines the struts 11 when lowered into engagement with the ground and these struts are illustrated in dot-and-dash lines in their upper transportation position $B_1a$. Two lateral arrangements $B_2$ identical with that described and illustrated in FIG. 3, are secured in a longitudinal position through their stay-plates 19 to the chassis CH. The struts 20 are shown as in contact with ground and are adapted to enter a transportation position $B_2a$. It is apparent that the normal basis of support of the vehicle illustrated in FIG. 5, is defined by the points at which the four vehicle wheels engage the ground at $a, b, c, d$, whereas the use of struts allows obtaining a basis of support defined by the points $a, b, e, f, g, h$, which is much larger than the original surface $a, b, c, d$.

It is apparent that the half-trailer illustrated in FIG. 6, carries a different distribution of collapsible struts B adapted to be used as bearing members, when said semi-trailer is disconnected with reference to its tractor. Either of the types of struts illustrated in FIGS. 1 and 3, may equip such a vehicle.

The struts will obviously be given a suitable length and may be housed advantageously between the girders and the cross-members of the chassis during transportation, as illustrated in dot-and-dash lines at $B_1$.

It should be remarked as concerns this arrangement, that when the struts serve as bearing members, no sliding part remains exposed to bad weather while the vehicle is stationary whereas, during transportation, said struts extend at no point outside the chassis as in the case where the bearing member is constituted by the terminal section of a telescopic jack.

What I claim is:

1. In combination with a vehicle including a chassis and wheels carrying same, the combination of at least one horizontally extending jack including a cylinder and a tubular shaft coaxially carried inside the cylinder with a large clearance therebetween and including an outer radial fin engaging the inner surface of the cylinder, means rigidly securing the cylinder to the chassis, means feeding fluid into the cylinder to produce an angular movement of the shaft with reference to the cylinder, at least one rod slidingly carried inside the tubular shaft and projecting beyond the corresponding end of the shaft outside the cylinder, means preventing rotation of the rods with reference to the shaft, and a strut rigid with the projecting end of each rod and adapted to be shifted upon rotation of the shaft between an upwardly raised position along one side of the chassis and an oblique downwardly and outwardly directed position engaging ground outside the base of support of the chassis.

2. In combination with a vehicle including a chassis and wheels carrying same, the combination of at least one horizontally extending jack including a cylinder and a tubular shaft coaxially carried inside the cylinder with a large clearance therebetween and including an outer radial fin engaging the inner surface of the cylinder, means rigidly securing the cylinder to the chassis, means feeding fluid into the cylinder to produce an angular movement of the shaft with reference to the cylinder, at least one rod slidingly carried inside the tubular shaft and projecting beyond the corresponding end of the shaft outside the cylinder, said rods having a longitudinally corrugated outer surface, a short sleeve inwardly rigid with the ends of the tubular shaft and provided with inner corrugations engaging the corrugations of the rods to guide the sliding movement of the latter and a strut rigid with the projecting end of each rod and adapted to be shifted upon rotation of the shaft between an upwardly raised position along one side of the chassis and an oblique downwardly and outwardly directed position engaging ground outside the basis of support of the chassis.

3. In combination with a vehicle including a chassis and wheels carrying same, the combination of a horizontally extending jack extending along each longitudinal side of the chassis and including a cylinder and a shaft coaxially carried inside the cylinder with a large clearance therebetween and including a radial fin engaging the inner surface of the cylinder, means rigidly securing one of said parts, the cylinder and the shaft to the corresponding side of the chassis, means feeding fluid into the cylinder to produce a relative angular movement of the shaft with reference to the cylinder, a strut rigid with the other part of the jack and adapted to be shifted between an upwardly raised position along one side of the chassis and an oblique downwardly and outwardly directed position engaging ground outside the basis of support of the chassis, a further horizontally extending jack including a cylinder and a tubular shaft coaxially carried inside the cylinder with a large clearance therebetween and including an outer radial fin engaging the inner surface of the cylinder, means rigidly securing the cylinder to the rear end of the chassis transversely of said chassis, means feeding fluid into the cylinder to produce an angular movement of the shaft with reference to the cylinder, at least one rod slidingly carried inside the tubular shaft and projecting beyond the corresponding end of the shaft outside the cylinder, means preventing rotation of the rods with reference to the shaft and a strut rigid with the projecting end of each rod and adapted to be shifted upon rotation of the shaft between an upwardly raised position along the rear of the chassis and an oblique downwardly and outwardly directed position engaging ground behind the basis of support of the chassis.

References Cited in the file of this patent

UNITED STATES PATENTS

| | | |
|---|---|---|
| 1,492,487 | Stokes | Apr. 29, 1924 |
| 2,194,594 | Halley | Mar. 26, 1940 |
| 2,375,264 | Wagner et al. | May 8, 1945 |
| 2,528,588 | Forslund | Nov. 7, 1950 |
| 2,864,625 | Clements | Dec. 16, 1958 |
| 2,926,889 | Obes | Mar. 1, 1960 |